United States Patent Office 2,813,755
Patented Nov. 19, 1957

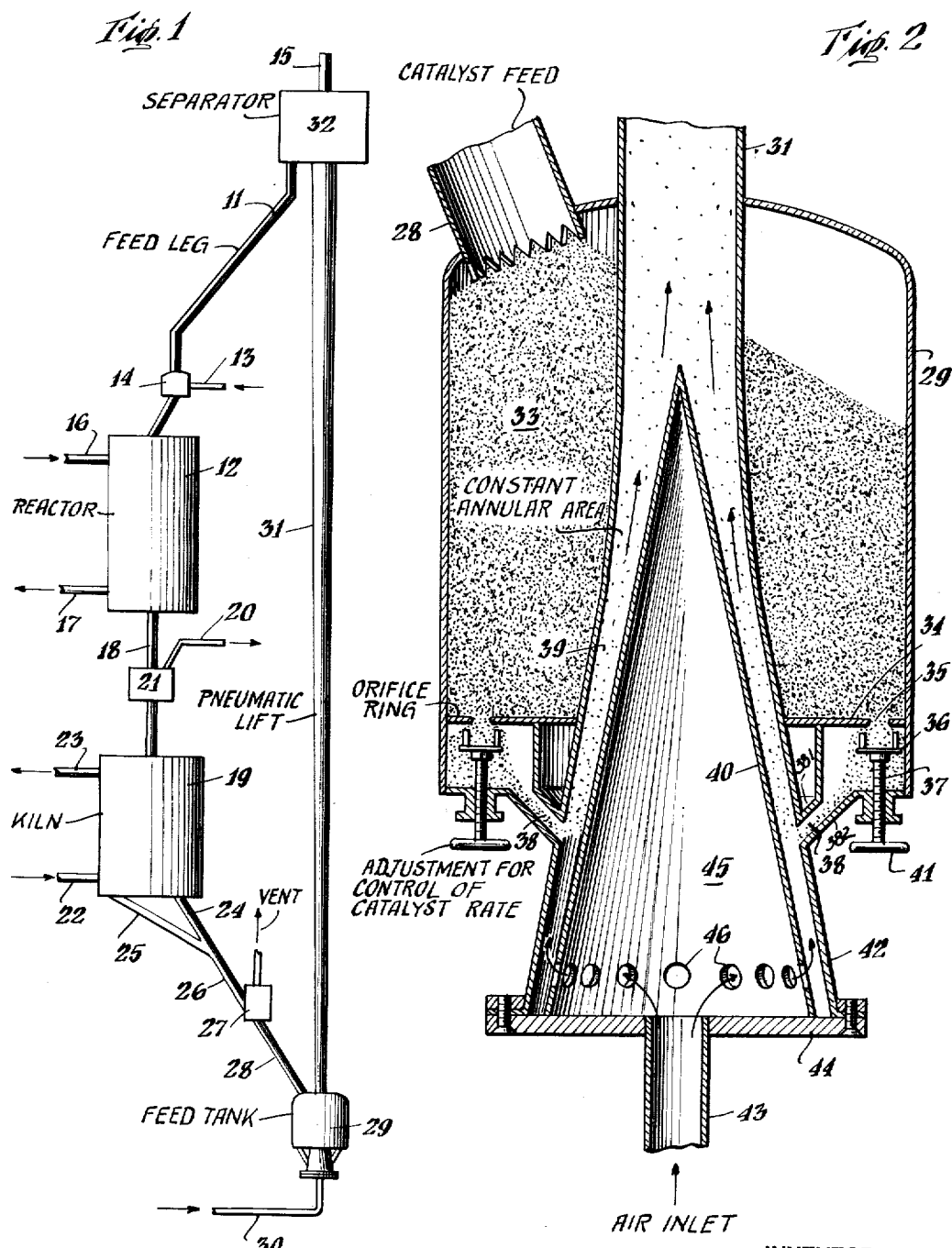

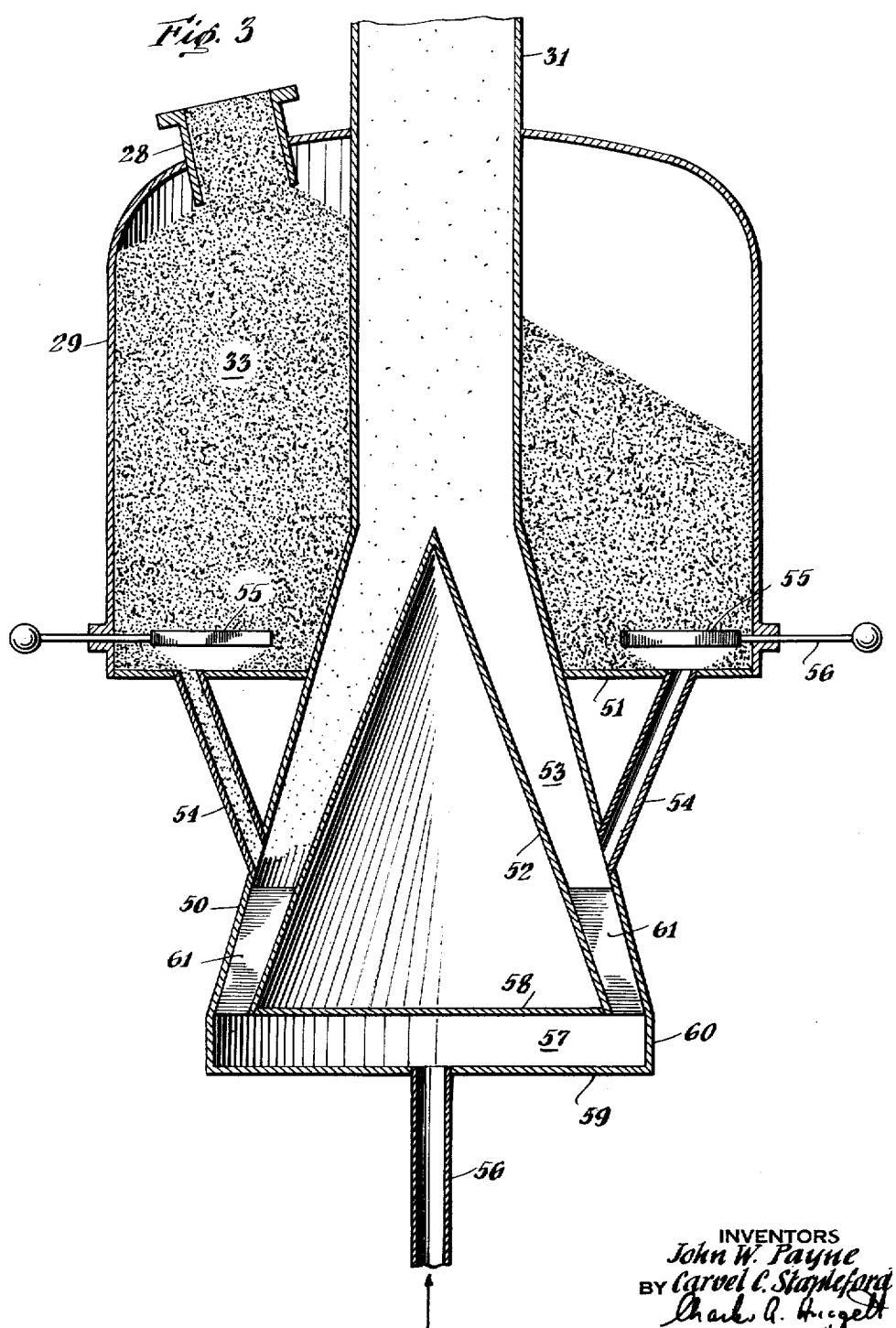

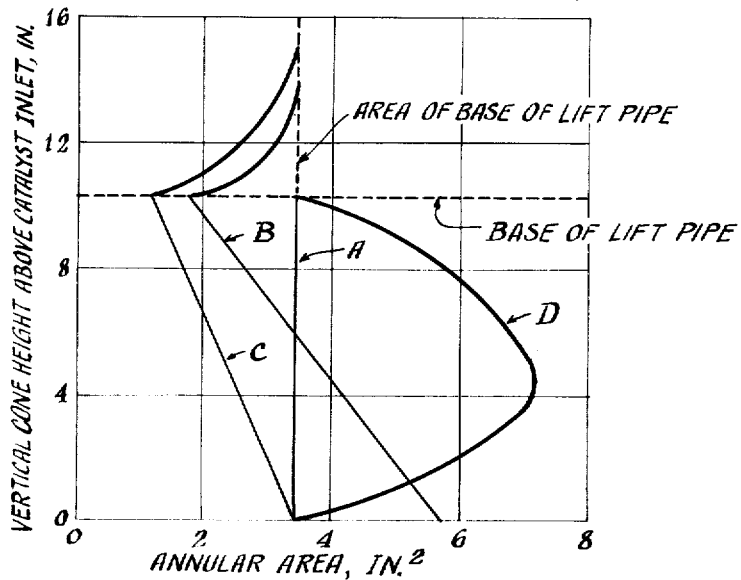
Fig. 4 — COMPARISON OF CROSS-SECTIONAL AREA V.S. CONE HEIGHT FOR FOUR LIFT TANK DESIGNS.
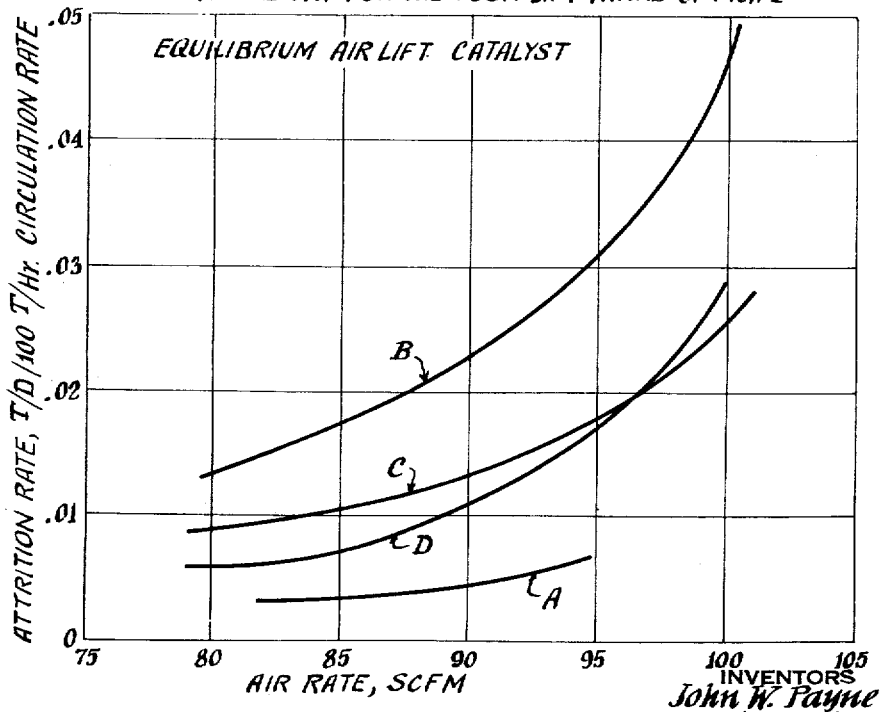
Fig. 5 — ATTRITION DATA FOR THE FOUR LIFT TANKS OF FIG. 4
INVENTORS
John W. Payne
BY Carvel C. Stapleford
Charles O. Huggett
ATTORNEYS

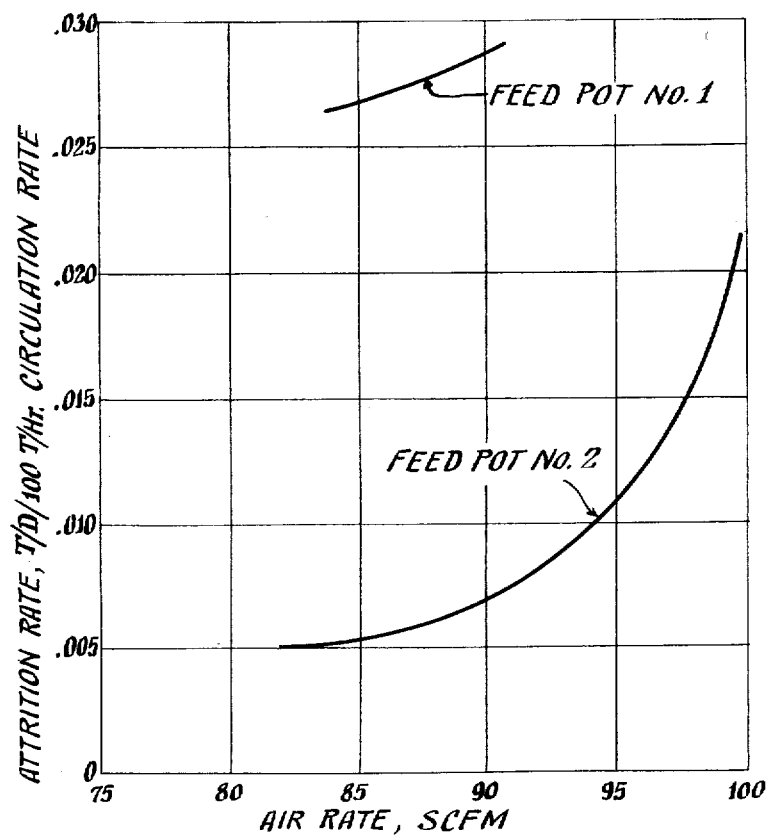

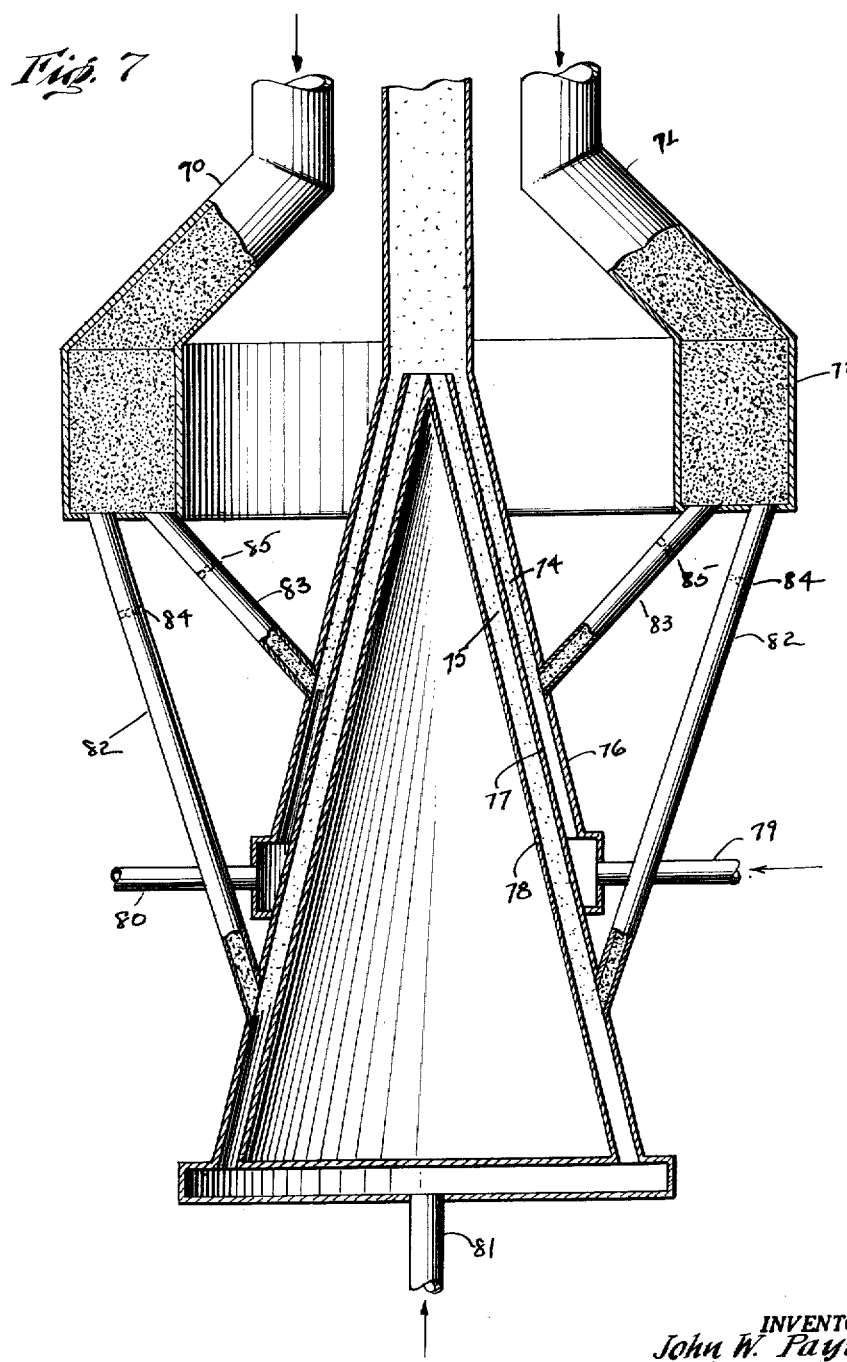

2,813,755

METHOD AND APPARATUS FOR FEEDING GRANULAR CONTACT MATERIAL INTO A DILUTE PHASE PNEUMATIC LIFT

John W. Payne and Carvel C. Stapleford, Woodbury, N. J., assignors to Socony Mobil Oil Company, Inc., a corporation of New York Application February 4, 1954, Serial No. 408,203

16 Claims. (Cl. 302—52)

This invention pertains to the feeding of a granular particulate contact material into the lower end of an upwardly extending lift pipe for passage therethrough in a stream of rapidly moving lift gas. It has particular application in continuous hydrocarbon conversion processes in which a granular contact material is circulated in an enclosed cyclic path which includes reaction and regeneration zones.

A variety of processes are known in the hydrocarbon conversion art in which a granular contact material or catalyst is gravitated as a compact mass through a reaction zone where it is contacted with a suitably prepared hydrocarbon at elevated temperature and a regeneration zone where a carbonaceous deposit formed on the catalyst during the conversion is removed by burning with air. Typical processes of this type are catalytic cracking, reforming, hydrogenation, dehydrogenation, desulfurization, coking and visbreaking. As a typical example in the catalytic cracking of heavy oils to produce lighter material boiling in the gasoline boiling range, a granular catalyst is gravitated as a compacted bed through a reactor and contacted with a suitably prepared hydrocarbon at a temperature of about 800 to 1000 degrees F., and a pressure of approximately 5 to 15 pounds per square inch gauge. The spent contact material is continuously removed from the bottom of the reactor and transferred to a gravitating bed of the catalyst in a kiln. Air, or a mixture of air and other gases, is blown through the catalyst bed in the kiln to burn the contaminants from the surface of the catalyst. The temperature in the kiln is generally maintained in a range of about 1000 to 1300° F., so that regeneration will occur at a rapid rate, but the temperature will not be so high that the catalyst is heat damaged and rendered unfit for reuse as a cracking catalyst. The regenerated contact material is withdrawn from the bottom of the kiln and transferred to the top of the reactor, thereby completing the enclosed cyclic path.

Recent moving bed processes have utilized pneumatic lifts for elevating the catalyst from beneath one of the vessels to a level above the other vessel. These gas lifts have largely superseded the former bucket elevators as a means of elevating the contact material. It is essential that the breakage rate of the catalyst passing through the lift be maintained exceedingly low in order that the system function efficiently. Excessive catalyst breakage in the lift causes an inordinate amount of catalyst to be used in the system. The catalyst in these moving bed processes must be maintained within a fairly narrow range of size in order that pressure drop through the bed be maintained low and gas flow through the bed be substantially uniform. An excessive amount of fine material in the catalyst stream cannot be tolerated and, therefore, the fines must be continuously removed from the process. If a great amount of catalyst is broken during the lifting step, the broken particles must be removed and replaced by fresh catalyst. This, of course, is exceedingly expensive and must be avoided. One form of gas lift used successively comprises an upwardly-extending open-ended lift pipe with its lower end terminated intermediate the top and bottom of the lift tank and its upper end terminated intermediate the top and bottom of a lift separator. In this type of lift the granular catalyst is introduced into the top of the lift tank to form a compact bed of granular material around the lower end of the lift pipe. A primary lift gas is introduced into the lower end of the lift pipe through a primary gas pipe which is projected upwardly through the bottom of the lift tank and terminated either just below the lift pipe or partially within the lower end of the lift pipe. This pipe projects upwardly above the level of catalyst below the lift pipe formed when no gas is flowing. As long as only primary gas is flowing, no catalyst is introduced into the lift pipe. However, a secondary gas is introduced into the lift tank at spaced locations about the lift pipe and this gas is introduced into the bed of catalyst around the lower end of the lift pipe at locations laterally displaced from the bottom of the pipe. The secondary gas pushes an annular stream of the catalyst into the lower end of the lift pipe and the commingled streams of primary and secondary gas then serve to elevate the catalyst in dispersed form through the lift pipe to the separator. Although this scheme of introducing catalyst into the lift pipe has been used successfully, a fairly substantial amount of catalyst breakage occurs in the lower end of the lift pipe.

In this invention the catalyst is dropped in free-fall downwardly into a thin annular stream of upwardly moving lift gas. The annular stream of lift gas is moved upwardly and inwardly at a controlled rate and discharged into the bottom of the lift pipe. The annular passageway through which the lift gas is passed has a gradually decreasing radial thickness from top to bottom, being at least substantially equal to the radius of the lift pipe at the top of the annular passageway. In the preferred arrangement, the annular passageway through which the lift gas is passed has a substantially constant cross-sectional area from top to bottom which is substantially equal to the cross-sectional area of the lift pipe at its lower end. This provides a generally smooth acceleration of the catalyst during its travel through the annular passageway. The particles are dropped in dispersed form through the annular stream of raising lift gas at a location where the passageway is thin in comparison to the size of the particles. The dispersed particles feed easily and uniformly into the annular passage and the passage is long enough between the bottom of the lift pipe and the point of catalyst entry so that the particles are moving substantially directly upward when they reach the bottom of the lift pipe. By using a passageway which slopes with respect to the horizontal at a rather steep angle, lateral components of velocity are largely eliminated.

The object of this invention is to provide an improved method and apparatus for feeding a granular contact material into the lower end of an upwardly extending lift pipe for transfer therethrough in a stream of lift gas in dispersed form.

A further object of this invention is to provide an improved method and apparatus for introducing granular contact material or catalyst into the lower end of a lift pipe in a continuous moving bed hydrocarbon conversion process.

A further object of this invention is to provide an improved method and apparatus for introducing a granular catalyst into a lift pipe with minimum catalyst attrition.

These and other objects of the invention will be made more apparent by reference to the drawings and the following detailed description of the invention.

Figure 1 shows diagrammatically a complete cyclic system of the moving bed type.

Fig. 2 shows apparatus for feeding a granular catalyst into the lower end of the lift pipe.

Figure 3 shows alternate apparatus for feeding a granular catalyst into the lower end of a lift pipe.

Figure 4 shows a comparison of the cross-sectional area vs. cone height for four lift tank designs.

Figure 5 shows attrition data for the four lift tanks of Figure 4.

Figure 6 shows attrition data showing the improvement of the instant lift tank with respect to the prior art lift tank on the basis of the catalyst breakage rate.

Figure 7 shows a modified form of lift tank partially in vertical section.

Referring now to Figure 1, which shows schematically the entire cyclic system of a moving bed conversion process, such as the TCC process, a granular contact catalyst is gravitated in compact form downwardly from the bottom of separator 32 through an elongated gravity feed leg 11, into a reactor 12. The feed leg is made long enough to feed the catalyst smoothly into the reactor against the advanced pressure therein. A suitable inert seal gas is introduced through the conduit 13, into the seal pot 14 in the lower end of the feed leg at a flow rate which is sufficient to pass a small amount of seal gas upwardly through the feed leg to the vent 15 in the separator and also a small amount of inert gas downwardly with the catalyst to prevent reactant material from rising through the feed leg. A hydrocarbon suitably prepared for treatment is introduced into the reactor through the conduit 16 and travels downwardly through the void spaces in the contact bed to be removed from the bottom of the reactor through the conduit 17. The reactants are cracked during passage through the reactor and the cracked products removed from the bottom of the reactor are transferred to further processing apparatus not shown. The spent contact material is continuously withdrawn from the bottom of the reactor as a compact column through the conduit 18 and supplied into the top of a gravitating bed of the contact material in the kiln 19. Gas pressure may be released through the conduit 20 to depressure the catalyst passing through the depressurizer 21. The temperature in the reactor may be about 800 to 1000° F., and the pressure in the reactor may be maintained at about 15 pounds per square inch gauge. Air is introduced into the kiln through the conduit 22 and travels upwardly through the void spaces in the gravitating bed to be removed from the top of the kiln through conduit 23 as flue gas. The burning is preferably carried out at substantially atmospheric pressure and at a temperature of about 1000 to 1300° F. Temperatures substantially in excess of about 1300° F. heat damage the contact catalyst rendering it unfit for re-use in the process. Therefore, it may be necessary to cool the catalyst during regeneration in order to prevent the temperature from rising above the heat damaging level. Of course, if inerts are used in a process such as the coking or visbreaking processes, this temperature can be substantially exceeded, since the function of the contact material in those cases is merely to carry heat and not act as a catalytic material. The regenerated contact material is withdrawn from the bottom of the kiln as a compact column through the pipes 24, 25 and 26 to the vent box 27. Catalyst is gravitated downwardly from the vent box 27 through the conduit 28 into the top of the lift tank 29. The catalyst in the lift feed tank 29 is contacted with lift gas introduced into the feeding apparatus through the pipe 30 and the mixture of lift gas and catalyst is transferred upwardly through the open-ended lift pipe 31 to the separator 32. The lift gas is separated from the catalyst in the separator and withdrawn from the separator through the vent pipe 15. The separated catalyst is introduced onto the surface of the bed of the catalyst maintained in the lower portion of the separator and then withdrawn through the feed leg 11 to replenish the supply of catalyst in the reactor 12.

Referring now to Figure 2, the feeding apparatus is shown in vertical section. The catalyst feeds into the top of the lift tank 29 through the pipe 28 to form a compact bed 33 in the lift tank 29 about the lower end of the lift pipe 31. The lift tank 29 has a horizontal floor 34 with a series of orifice holes 35 (or alternatively a single annular slot) located about the outer portion thereof in the form of a ring. Catalyst flow control members 36 are located at the upper end of spindles 37. The spindles 37 are adjustable in a vertical direction by the rotation of the wheels 41. By adjusting the spindles 37 to the desired level the flow of catalyst through the orifices can be set at that rate required for the particular catalyst circulation rate involved. The catalyst discharged through the orifices drops in substantially free-fall through a second passageway 38. This passageway is formed by two concentric frusto-conical members 381 and 382. A first passageway 39 is provided of annular cross-section below the lift pipe, the cross-sectional area of this passageway being substantially constant from top to bottom and substantially equal to the cross-sectional area of the lower end of the lift pipe. The inner wall of the first passageway 39 is formed by a right conical member 40, having its axis substantially coaxial with that of the lift pipe and having the apex of the cone located at substantially the same level as the bottom of the lift pipe. The outer wall of the first passageway 39 is formed by a member 42 which curves outwardly from top to bottom substantially in the form of a parabola. This member is curved outwardly from substantially directly upward at the upper end to an angle of about 70 to 80 degrees with the horizontal at its lower end. The passageway 38 is connected to the outer wall 42 at a common level, the thickness of the first passageway 39 at that level being about ½ to 4 inches for a granular cracking catalyst broadly and preferably ¾ to 2 inches. This is the minimum thickness of the annular passage and is termed the "gap." It is important that the gap be maintained within the prescribed limits for preferred operation. The second passageway 38 communicates with the first passageway 39 through a continuous horizontal slot in the outer wall 42. The angle of the side wall of the conical member 40 is made steep with respect to the horizontal and is preferably at an angle of about 70 to 80 degrees with the horizontal. The lift gas is introduced through the pipe 43 which projects through the floor 44 at the bottom of the right cone. The gas is discharged from the region 45 enclosed by the floor 44 and the right cone 40 through a plurality of orifices 46 uniformly distributed about the lower end of the conical member 40. The gas, which travels upwardly in the first annular passageway 39, contacts the particles introduced in dispersed form through the passageway 38. Since the first annular pasageway 39 has a small lateral or radial thickness in comparison to the size of the particles at the point of particle introduction and the particles are dispersed as they feed into the annular gas stream, the particles are accelerated uniformly in an upward direction without turbulence and lateral side movement. Since the passageway is rather steep, the particles are discharged from the upper end of the passageway 39 into the lower end of the lift pipe with very little horizontal velocity component, and the catalyst breakage in the lower end of the lift pipe is materially reduced thereby.

Referring now to Figure 3, there is shown an alternate embodiment of the invention. The upwardly extending pipe 31 is shown with its lower end projected downwardly into a lift tank 29. The lift tank is supplied with catalyst by the conduit 28 to thereby form a bed of catalyst in the lift tank 29. A frusto-conical member 50 is shown attached to the lower end of the life pipe 31, being projected upwardly through the floor 51 of the lift tank 29. Concentric with the frusto-conical member 50 and the lift pipe 31 is located a conical member 52. The wall of the conical member 52 has a smaller angle with respect to the horizontal than the wall of the frusto-conical member 50, so that the annular passage 53 formed between these members has a gradually decreasing radial thickness from top to bottom. It is seen that in this embodiment, the annular passage 53 does not have a constant cross-sectional area equal to that of the bottom of the lift pipe, but has a cross-section which changes gradually from top to bottom. A plurality of conduits 54 are distributed uniformly about the bottom of the lift tank 29. These conduits connect the bottom of the lift tank with the passageway 53. Above the upper ends of the conduits 54 within the tank 29, are located slide valves 55. These valves have handles 56 which project outwardly through the wall of the tank 29, and are so arranged that the plate of the valve can be moved horizontally so as to cover the upper ends of the conduits 54, thereby preventing catalyst from entering these conduits or to open the conduits allowing catalyst to flow in free-fall thereinto. The valves 55 can, therefore, be adjusted for the desired catalyst flow rate. Catalyst falls in free-fall through the conduits 54 and enters the annular passage 53 at locations uniformly distributed about the passage at a common elevation where the radial thickness of the passage is reasonably small in comparison to the size of the particles being transferred. Lift gas is introduced through the pipe 56 into a chamber 57 formed beneath the passage 53. This chamber is formed by a horizontal floor 58 located at the bottom of the conical member 52, a second flat member 59 located a spaced distance below the floor 58, and a ring-type cylindrical baffle 60 attached to the bottom of the frusto-conical member 50. The lift gas introduced at a central location of the chamber 57 spreads radially to enter the bottom of the passage 53 and passes upwardly through the passage. A multiplicity of vertical vanes 61 arranged in a radial pattern about the lower end of the passage remove circumferential velocity components from the lift gas and direct it into the passage in a substantially upward direction. The catalyst engages the lift gas at a level just above the straightening vanes 61 and is swept directly upward into the lower end of the lift pipe and transferred through the lift pipe to the separator thereabove.

Referring now to Figure 4, there is shown a comparison of the cross-sectional area of the passageway of four different lift tank designs, the area of the passageway being plotted against the vertical cone height above the catalyst inlet. These different passageways are denominated A, B, C and D.

Tests were made using these lift tank designs and a lift pipe having the following characteristics:

Bottom diameter=2.135 in.
Top diameter=3.295 in.
Height of lift=19.75 ft.

The solids circulation rate in each case was 1.7 tons per hour. The granular solids used had an average particle diameter of 0.085 inch, and were screened from bead catalyst taken from an operating TCC unit. This catalyst had been circulated through the lift pipe for a large number of cycles before attrition data were obtained, and may be termed equilibrium catalyst. The characteristics of these annular passages were as follows:

A. Constant cross-sectional area from top to bottom equal to area of base of life pipe, right regular frusto-conical outer member, and tapered inner right cone, with 30-degree included apex angle, gap thickness at point of entry of catalyst=$3/16''$.

B. Gradually changing cros-sectional area from point of catalyst entry up to base of the lift pipe, formed by concentric cones, the inner right cone being projected into the lower end of the lift pipe and having an included apex angle of 30-degrees, the gap thickness being constant at $5/16''$.

C. Gradually changing cross-sectional area from point of catalyst entry up to base of the lift pipe, formed by concentric cones, the inner right cone being projected into the lower end of the lift pipe and having an included apex angle of 30-degrees, the gap thickness being constant at $3/16''$.

D. Gradually changing cross-sectional area from the point of catalyst entry up to base of the lift pipe, formed by cones having sidewalls at different angles with the horizontal, the cross-sectional area at the point of catalyst entry and at the base of the lift pipe being equal to the area of the base of the lift pipe, the gap thickness at the point of catalyst entry being $3/16''$ and the lateral thickness of the passageway increasing uniformly from bottom to top.

These varying characteristics were obtained by changing the shape of the inner cone or confining wall, and using the same outer cone for all cases. It will be noted from Figure 5, a plot of attrition data vs. air rate for the four lift pot designs discussed above that type A, where the annular area of the passageway equals the area of the base of the lift pipe, are the lowest. Also, type C gave lower attrition than type B. This is believed to be due to use of a smaller gap at the point of entry of the catalyst in type C as compared to that used in type B.

In this invention, the shapes of the confining surfaces (the inner and outer conical members) must be such that the annular area does not change radically at any level from the level of solids entry up to the base of the lift pipe. In the most preferred form of the invention, the area is kept constant from the point of solids entry up to the base of the lift pipe and the inner cone is terminated at the base of the lift pipe. This may be obtained by using a curved outer wall, inner wall or both. The walls should be curved gradually, so that the gas and catalyst flow in streamlined flow through the annular passageway. All rapid changes in direction of the passageway and protuberances in the passageway must be avoided. The vertex angle of both the inner and outer wall of the passageway should be 40 degrees or less; thereby providing a circumferentially continuous passageway which slopes downward and outward from the base of the lift pipe at a steep angle with the horizontal.

The lateral thickness of the annular passageway at the point of entry of the catalyst should be small in relation to the diameter of the catalyst. This thickness may be termed the gap at point of entry of the catalyst or just the gap. Good results can be obtained with a gap of about 4 bead diameters, although to prevent plugging the gap should be at least 5 bead diameters and preferably 8 bead diameters. For ordinary cracking or reforming catalyst of approximately 0.120 inch diameter, the gap should be broadly about $1/2-4''$ although a gap of about $3/4-2''$ is preferred. The catalyst should enter the annular passageway through a circumferentially complete horizontal slot, although the catalyst may enter the passageway through a series of holes or apertures in the outer wall of the passageway, provided they are closely spaced about the periphery of the passageway. The particles may be dropped in free-fall through the continuous slot but preferably they are rolled or forced to slide down a short inclined conical baffle before entering the slot. For example, referring to Figure 2, the wall of the frusto-conical member 382 is preferably located at an angle with the horizontal of about 35–70 degrees broadly, and preferably 40–60 degrees. It is preferred that the inner wall of the annular passageway 39 terminate in a point which is concentric with the axis of the lift pipe and located substantially at the base of the lift pipe. This point may be extended 2 or 3 inches into the lower end of the lift pipe or may be located up to 2 or 3 inches below the lower end of the lift pipe. The ratio of height to diameter of this central conical member should be 1–4 broadly and preferably $1 1/2-3$.

Example 1

A lift tank similar to that shown on Figure 2 was prepared for use on a lift pipe having an average diameter of 16" and a height of 200 feet. This lift tank had the following critical dimensions:

| L, Distance Below Apex of Inner Cone | $D_o$, Diameter of Outside Cone | $D_I$, Diameter of Inside Cone | $\frac{D_o - D_I}{2}$, Thickness of Passageway |
|---|---|---|---|
| 5" | 13.8 | 2.17 | 5.82 |
| 10" | 14.32 | 4.34 | 4.99 |
| 15" | 15.16 | 6.51 | 4.32 |
| 20" | 16.24 | 8.68 | 3.78 |
| 25" | 17.56 | 10.86 | 3.53 |
| 30" | 19.00 | 13.03 | 2.99 |
| 35" | 20.6 | 15.20 | 2.70 |
| 40" | 22.3 | 17.27 | 2.52 |
| 45" | 24.2 | 19.54 | 2.33 |
| 50" | 26.0 | 21.71 | 2.15 |
| 52" | 26.75 | 22.58 | 2.09 |
| 55" | 28.0 | 23.88 | 2.06 |
| 76" | 36.0 | 33.00 | 1.50 |

The particles were introduced into the annular passageway at a level 52" below the top of the inner cone and the lateral thickness of the passageway at that point was seen to be 2.09".

Figure 6 shows a plot of attrition rate vs. air rate for a lift using a lift pot of the prior art as compared with a lift using a lift pot incorporating the instant invention. Feed pot No. 1 is the prior art lift in which the catalyst is introduced into the lift pot to form a compact mass of catalyst about the lower end of the lift pipe, primary gas is introduced into the bottom of the lift pipe above the level of catalyst, so that the primary gas enters the pipe without passing through any thickness of the catalyst bed and secondary gas is introduced into the catalyst bed to push catalyst into the lower end of the lift pipe. Feed pot No. 2 is the present disclosed design in which the catalyst is fed in dispersed form through a continuous horizontal slot in the outer wall of a circumferentially complete annular passage which slopes inwardly from bottom to top at a steep angle with the horizontal and discharges into the bottom of the lift pipe. It is seen that there is a subsantial reduction in attrition for the feed pot No. 2 as compared to that for the feed pot No. 1.

Figure 7 shows an alternate embodiment of the invention which is exceedingly useful when the cross-section of the lift pipe supplied with catalyst is large. Catalyst is supplied in this embodiment through conduits 70 and 71 into the annular or doughnut vessel 72 to form a compact mass of solids therein. A pair of concentric annular passageways 74, 75 is formed by the frusto-conical members 76, 77 and the central conical member 78. The outer member 76 is terminated at a level above the bottom of the inner members 77 and 78. One stream of lift gas is introduced into the outer passageway 74 through the conduits 79, 80. A second stream of lift gas is introduced into the inner passageway 75 through the conduit 81. A multiplicity of conduits 82, 82 is arranged in a ring about the bottom of the vessel 72. The conduits 82, 82 are connected at their lower ends to the frusto-conical member 77. A second multiplicity of conduits 83, 83 is arranged in a ring about the bottom of the vessel 72. These conduits are connected at their lower ends to the frusto-conical member 76. Restricting orifice plates 84, 85 are located in the conduits 82, 83 to convert the catalyst flow from compact transfer to free flow. By using a plurality of passageways for feeding catalyst into the lift pipe 86, the height of the passageways is made smaller or the height of the conical member 78 is reduced over that which would be required if only one passageway were used for the large diameter lift pipe. It is obvious that more than two concentric passageways can be used to further reduce the height of the feeding apparatus.

By the use of the term "annular passageway" in describing the path through which the lift gas and catalyst ascend, it is meant that the horizontal cross-section of the passageway is the space located between two concentric circles. Alternatively, the passageway cross-section may be substantially annular by using a confining member in the form of a polygon having many sides so that the cross-section conforms substantially to that made by two concentric circles. In vertical cross-section the annular passageway slopes inwardly from bottom to top at a steep angle with the horizontal. The outer confining member has a circumferentially complete slot in its outer wall, so that particles can be dropped through the slot to contact the upwardly flowing stream of air in the annular passageway. The particles in the feed pot are in compact form and the bed in the pot is deep enough so that the bed serves as a seal to prevent the flow of gas through the catalyst feeding passage or passages. By this expedient the catalyst flows through the feeding passages as freely falling or rolling particles rather than as a suspended or partially suspended stream. The gas flow is, therefore, limited to the desired flow path. The orifice plate or plates are sized to permit the desired catalyst flow rate in free-fall and are the flow control means for the catalyst.

The examples and illustrations, given hereinabove, were supplied to illustrate the invention, and not to limit its scope. It is intended that the scope of this invention be considered broadly to cover all changes and modifications of the examples of the invention herein chosen for purposes of disclosures, which do not constitute departures from the spirit of the invention.

We claim:

1. Improved apparatus for introducing a granular contact material into the lower end of an upwardly-extending, open-ended lift pipe comprising in combination: a laterally confined continuous, annular passageway extending downwardly and laterally from the base of the lift pipe, at a steep angle with the horizontal, the radial thickness of the passageway decreasing gradually from top to bottom thereof, means for introducing lift gas into the base of the annular passageway, and means defining an inlet in the passageway, located intermediate the top and bottom thereof, for the introduction of granular material thereinto.

2. Improved apparatus for introducing a granular contact material into the lower end of an upwardly-extending, open-ended lift pipe comprising in combination: a laterally confined continuous, annular passageway extending downwardly and laterally from the base of the lift pipe, at a steep angle with the horizontal, the cross-sectional area of the passageway at all elevations being substantially equal to the cross-sectional area of the base of the lift pipe, means for introducing lift gas into the base of the annular passageway, and means defining an inlet in the passageway, located intermediate the top and bottom thereof, for the introduction of granular material thereinto.

3. Improved apparatus for introducing a granular contact material into the lower end of an upwardly-extending, open-ended lift pipe, comprising in combination: a laterally confined, continuous, annular passageway extending downwardly and laterally from the base of the lift pipe, at an angle greater than about 70 degrees with the horizontal, the cross-sectional area of the passageway at all elevations being substantially equal to the cross-sectional area of the base of the lift pipe, means for introducing lift gas into the base of the annular passageway and means defining an inlet in the passageway, located intermediate the top and bottom thereof, for the introduction of granular material thereinto.

4. Improved apparatus for introducing a granular contact material into the lower end of an upwardly-extending, open-ended lift pipe, comprising in combination: a laterally confined, continuous, annular passageway extending downwardly and laterally from the base of the lift pipe, at an angle of about 70–80 degrees with the horizontal, the cross-sectional area of the passageway at all elevations being substantially equal to the cross-sectional area of the base of the lift pipe, means for introducing a lift gas into the base of the annular passageway and means defining an inlet in the passageway, located intermediate the top and bottom thereof, for the introduction of granular material thereinto.

5. Improved apparatus for introducing a granular contact material into the lower end of an upwardly-extending, open-ended lift pipe, comprising in combination: a laterally confined, continuous, annular passageway extending downwardly and laterally from the base of the lift pipe, at an angle of about 70–80 degrees with the horizontal, the cross-sectional area of the passageway at all elevations being substantially equal to the cross-sectional area of the base of the lift pipe, the inner wall of the passageway being conical, in shape, with the apex of the cone located substantially on the centerline of the lift pipe and at the lower end thereof, means defining a plurality of apertures in the lower end of the inner conical wall, uniformly distributed about the wall, means for introducing lift gas into the region enclosed by the conical wall, to pass through the apertures to the annular passageway and means defining an inlet in the passagway, located intermediate the top and bottom thereof, for the introduction of granular material thereinto.

6. Improved apparatus for introducing a granular contact material into the lower end of an upwardly-extending, open-ended lift pipe, comprising in combination: a lift tank located about the lower end of the lift pipe, with the pipe terminated intermediate the top and bottom of the tank, a laterally confined, continuous, annular passageway extending downwardly and laterally from the base of the lift pipe, at an angle of about 70–80 degrees with the horizontal, the cross-sectional area of the passageway at all elevations being substantially equal to the cross-sectional area of the base of the lift pipe, the lower end of said passageway extending below the bottom of the lift tank, the inner wall of the passageway being conical, in shape, with the apex of the cone located substantially on the centerline of the lift pipe and at the lower end thereof, the outer wall of the passageway being curved outwardly from top to bottom along a substantially parabolic curve, a horizontal floor extending across the bottom of the inner conical wall and the bottom of the passageway, means defining a plurality of orifices in the lower portion of the inner wall, uniformly distributed about the periphery of said wall, a gas inlet pipe projected upwardly through the floor into the region enclosed by said inner wall, means defining a second plurality of orifices in the bottom of said lift tank, uniformly distributed about the bottom of the tank, control valves cooperating with said second plurality of orifices, for adjusting the flow of solids therethrough, conduit means connected between the bottom of the tank and the outer wall of said passageway, for transferring granular solids discharged through said orifices into said annular passageway and conduit means attached to the top of said lift tank, for feeding granular solids to the tank.

7. Improved apparatus for introducing a granular contact material into the lower end of an upwardly-extending, open-ended lift pipe, comprising in combination: a laterally-confined, continuous, annular passageway extending downwardly and laterally from the base of the lift pipe, at an angle of about 70–80 degrees with the horizontal, the cross-sectional area of the passageway at all elevations being substantially equal to the cross-sectional area of the base of the lift pipe, means defining an inlet in the passageway, at a level below the lift pipe, at which the lateral thickness of the passageway is within the range of about ½ to 4 inches, for the introduction of granular material thereinto, and means for introducing a lift gas into the lower end of the passageway.

8. Improved apparatus for introducing a granular contact material into the lower end of an upwardly-extending, open-ended lift pipe, comprising in combination: a laterally-confined, continuous, annular passageway extending downwardly and laterally from the base of the lift pipe, formed between an inner conical element, having a sidewall disposed at about 70–80 degrees with the horizontal and an outer element sloping outwardly from top to bottom, in the form of a parabola, the cross-sectional area of the passageway at all elevations being substantially equal to the cross-sectional area of the base of the lift pipe, the apex of the inner conical element being located concentric with the axis of the lift pipe and at an elevation substantially equal to that of the bottom of the lift pipe, means defining a plurality of apertures in the lower end of the inner conical element, uniformly distributed about said element, means for introducing lift gas into the region enclosed by the conical wall, to pass through the apertures to the annular passageway, and means defining an inlet in the passageway, located at a level below the bottom of the lift pipe, at which the lateral thickness of the annular passageway is about ¾ to 2 inches.

9. Improved apparatus for introducing a granular contact material into the lower end of an upwardly-extending, open-ended lift pipe, comprising in combination: a lift tank located about the lower end of the lift pipe, with the pipe terminated intermediate the top and bottom of the tank, a laterally confined, continuous, annular passageway extending downwardly and laterally from the base of the lift pipe, the cross-sectional area of the passageway at all elevations being substantially equal to the cross-sectional area of the base of the lift pipe, the lower end of said passageway extending below the bottom of the lift tank, the inner wall of the passageway being conical, in shape, with the apex of the cone located substantially on the centerline of the lift pipe and the apex angle of the cone being about 20–40 degrees, the outer wall of the passageway being curved outwardly from the top to bottom along a substantially parabolic curve, a horizontal floor extending across the bottom of the inner conical wall and the bottom of the passageway, means defining a plurality of orifices in the lower portion of the inner wall, uniformly distributed about the periphery of said wall, a gas inlet pipe projected upwardly through the floor into the region enclosed by said inner wall, means defining a second plurality of orifices in the bottom of said lift tank, uniformly distributed about the bottom of the tank, control valves cooperating with said second plurality of orifices, for adjusting the flow of solids therethrough, a plurality of downwardly extending pipes attached to the bottom of said lift tank and connected at their lower ends to the outer wall of said passageway, at a common elevation and points uniformly distributed about the passageway, the lateral thickness of the passageway at the level of the lower end of said pipes being about ½ to 4 inches, said pipes cooperating with said second plurality of orifices and said control valves to transfer streams of contact material in free-fall to the annular passageway for upward transfer through the lift pipe.

10. Improved apparatus for introducing a granular contact material into the lower end of an upwardly-extending, open-ended lift pipe, comprising in combination: a lift tank located about the lower end of the lift pipe, a substantially conical member and substantially frusto-conical member concentric with the lift pipe, located in stacked relationship to each other, to provide a passageway which is circumferentially continuous in a horizontal plane and which has a substantially annular horizontal cross-section, the members having walls which are disposed at an angle of about 70–80 degrees with the horizontal, with the wall of the outer member not less than that of the inner wall, but not substantially greater than that of the inner member, the outer member being attached to the bottom of the lift pipe at its upper end and the top of the inner member being located at about the bottom of the lift pipe, means defining a horizontally continuous slot in the outer member at a level a substantial distance below the top of that member, a pair of inverted frusto-conical feeding members attached at their upper ends to the bottom of the lift tank and at their lower end to the frusto-conical member, at opposite sides of the continuous slot, so as to define a catalyst feeding passageway, flow restricting means associated with said passageway, and means for introducing a lift gas into the lower end of the annular passageway between the conical and frusto-conical members, in sufficient quantity to elevate the catalyst through the lift pipe with minimum attrition.

11. Claim 10 further characterized in that at least one of the conical or frusto-conical members defining the passageway is curved along a smooth curve from top to bottom, an amount sufficient to maintain the cross-section of the passageway substantially constant from top to bottom and substantially equal to the cross-section of the bottom of the lift pipe.

12. Claim 10 further characterized in that the conical and frusto-conical members have walls which slope inwardly from bottom to top at an angle of about 65–85 degrees with the horizontal.

13. Claim 10 further characterized in that at least the outer members of the inverted frusto-conical members slope outwardly from bottom to top at an angle of about 40–60 degrees with the horizontal.

14. Claim 10 further characterized in that at least the outer member of the inverted frusto-conical members slopes outwardly from bottom to top at an angle of about 35–70 degrees with the horizontal.

15. An improved method for feeding granular solid material into an upwardly-extending lift passage through which it is lifted by a lift gas to an elevated receiving zone, which method comprises: flowing a lift gas stream of annular cross-section upwardly and inwardly through a first passage of restricted radial thickness which terminates at its upper end at the inner periphery of the bottom of the lift passage, said first annular passage being of substantial length relative to its restricted radial thickness, maintaining a substantially compact bed of said solid material surrounding the first annular passage at at least one level and in communication with the interior of said passage through a downwardly and inwardly directed second passage of annular cross-section and restricted thickness which passage merges with the outer periphery of said upwardly and inwardly-extending first passage near the lower end thereof, impeding the flow of solid material from the compact bed into the downwardly and inwardly-directed second passage sufficiently to convert the flow of solid material in the downwardly and inwardly-directed second passage to a freely falling stream of separated particles, whereby the falling particles merge smoothly with the lift gas and enter the lift passage with minimized attrition.

16. Claim 15 further characterized in that the walls of the upwardly and inwardly-directed first passage have no more than a slight curvature with each wall arranged to provide no more than slight change in cross-section from level to level, the slope of the passage being steep relative to the horizontal and the length of the passage being sufficient relative to the gas flow and particles being conveyed to introduce the particles upwardly into the lower end of the lift passage with substantially only a vertical component of velocity.

References Cited in the file of this patent

UNITED STATES PATENTS

| 2,255,438 | Robinson | Sept. 9, 1941 |
| 2,666,731 | Bergstrom | July 19, 1954 |

U. S. DEPARTMENT OF COMMERCE
PATENT OFFICE
CERTIFICATE OF CORRECTION

Patent No. 2,813,755

November 19, 1957

John W. Payne et al.

It is hereby certified that error appears in the printed specification of the above numbered patent requiring correction and that the said Letters Patent should read as corrected below.

Column 2, line 1, for "successively" read -- successfully --; line 44, for "raising" read -- rising --; column 5, line 69, for "cros-sectional" read -- cross-sectional --.

Signed and sealed this 25th day of February 1958.

(SEAL)
Attest:
KARL H. AXLINE

Attesting Officer

ROBERT C. WATSON
Commissioner of Patents